US005889885A

United States Patent [19]

Moed et al.

[11] Patent Number: 5,889,885
[45] Date of Patent: *Mar. 30, 1999

[54] METHOD AND APPARATUS FOR SEPARATING FOREGROUND FROM BACKGROUND IN IMAGES CONTAINING TEXT

[75] Inventors: Michael C. Moed, Ridgefield; Izrael S. Gorian, Bethel, both of Conn.

[73] Assignee: United Parcel Service of America, Inc., Atlanta, Ga.

[*] Notice: This patent issued on a continued prosecution application filed under 37 CFR 1.53(d), and is subject to the twenty year patent term provisions of 35 U.S.C. 154(a)(2).

[21] Appl. No.: 847,303

[22] Filed: Apr. 24, 1997

Related U.S. Application Data

[63] Continuation of Ser. No. 380,732, Jan. 31, 1995, abandoned.
[51] Int. Cl.⁶ ............................................. G06K 9/00
[52] U.S. Cl. ......................... 382/172; 382/171; 382/270
[58] Field of Search .................................. 382/171, 172, 382/205, 245, 270, 271, 176, 273; 358/466

[56] References Cited

U.S. PATENT DOCUMENTS

| 3,715,724 | 2/1973 | Demonte et al. | 382/271 |
| 4,003,999 | 1/1977 | Kawahara | 382/194 |
| 4,119,947 | 10/1978 | Leighton et al. | 382/273 |

(List continued on next page.)

FOREIGN PATENT DOCUMENTS

| PCT/US96/01060 | 10/1996 | European Pat. Off. . |
| 59-60690 | 4/1984 | Japan . |
| 60-146378 | 8/1985 | Japan . |
| 61-58087 | 3/1986 | Japan . |
| 89300874 B | 1/1989 | Japan . |
| 1-137385 | 5/1989 | Japan . |
| 89117132.4 | 9/1989 | Japan . |
| 4-268987 | 9/1992 | Japan . |
| 4-268989 | 9/1992 | Japan . |

OTHER PUBLICATIONS

M.M. Menon, An Efficient MRF Image–Restoration Technique Using Deterministic Scale–Based Optimization, The Lincoln Laboratory Journal, vol. 6, No. 1, 1993.

Neural Networks for Computing, Snowbird, Divko R. et al., *Stochastic Spin Models for Pattern Recognition*, Apr. 13–16, 1986, No. 1986, pp. 129–134, XP 000040996, see p. 132, para. 3 –p. 134, para. 2.

Pattern Recognition, Shiaw–Shian Yu et al, *Relaxation by the Hopefield Neural Network*, vol. 25, No. 2, 1 Feb. 1992, XP 000263525, pp. 197–209.

Chen, "Run Length Coding Based New Approach to Automatic Image Thresholding," Circuits and Systems, 1993 IEEE Int'l. Symposium, pp. 555–558.

Liu et al., "An Object Attribute Thresholding Algorithm for Document Image Binarization," Document Analysis, 1993 Int'l Conference, pp. 278–281.

L. O'Gorman, *Experimental Comparisons of Binarization and Multi–Thresholding Methods on Document Images*, IEEE/IAPR Conference on Pattern Recognition, Oct. 9–13, 1994.

*Primary Examiner*—Yon J. Couso
*Attorney, Agent, or Firm*—Jones & Askew, LLP

[57] ABSTRACT

A method and apparatus for thresholding gray-scale images containing text as foreground and dirt, colors, noise and the like as background. The method is adaptive in nature and can successfully separate a wide variety of text fonts and sizes, whether printed, typewritten, or handwritten, from the image background. The method uses multiple sets of thresholding process parameters in a contrast-based histogram evaluation to produce multiple candidate thresholded binary images. The method automatically selects the highest quality binary image, that is, the binary image that best represents text in the foreground, from among the multiple candidate binary images. The apparatus for implementing the method is a pipeline processor for highest speed.

19 Claims, 12 Drawing Sheets

5,889,885
Page 2

U.S. PATENT DOCUMENTS

| | | | |
|---|---|---|---|
| 4,504,972 | 3/1985 | Scherl et al. | 382/171 |
| 4,547,811 | 10/1985 | Ochi et al. | 358/455 |
| 4,736,441 | 4/1988 | Hirose et al. | 382/101 |
| 4,742,556 | 5/1988 | Davis, Jr. et al. | 382/172 |
| 4,794,239 | 12/1988 | Allais | 235/462 |
| 4,809,308 | 2/1989 | Adams et al. | 382/150 |
| 4,837,450 | 6/1989 | Satomura et al. | 358/487 |
| 4,879,753 | 11/1989 | El-Sherbini | 382/270 |
| 4,888,646 | 12/1989 | Umeda et al. | 382/270 |
| 4,924,078 | 5/1990 | Sant'Anselmo et al. | 235/494 |
| 4,929,979 | 5/1990 | Kimoto et al. | 358/457 |
| 4,931,881 | 6/1990 | Matsui et al. | 358/466 |
| 4,998,122 | 3/1991 | Kanno et al. | 382/270 |
| 5,003,616 | 3/1991 | Orita et al. | 382/282 |
| 5,046,114 | 9/1991 | Zobel | 382/171 |
| 5,048,096 | 9/1991 | Beato | 382/176 |
| 5,073,953 | 12/1991 | Westdijk | 382/176 |
| 5,081,690 | 1/1992 | Tan | 382/271 |
| 5,086,485 | 2/1992 | Lin | 382/172 |
| 5,091,965 | 2/1992 | Kobayashi et al. | 382/15 |
| 5,121,224 | 6/1992 | Ng et al. | 358/462 |
| 5,166,986 | 11/1992 | Mizuoka et al. | 382/172 |
| 5,179,599 | 1/1993 | Formanek | 382/172 |
| 5,220,615 | 6/1993 | Ishii et al. | 382/281 |
| 5,268,967 | 12/1993 | Jang et al. | 382/132 |
| 5,384,864 | 1/1995 | Spitz | 382/177 |
| 5,444,797 | 8/1995 | Spitz et al. | 382/177 |
| 5,452,367 | 9/1995 | Bick et al. | 382/128 |
| 5,502,776 | 3/1996 | Wanabe | 358/466 |
| 5,572,602 | 11/1996 | Naoi et al. | 382/178 |
| 5,581,633 | 12/1996 | Hotta et al. | 382/177 |
| 5,583,659 | 12/1996 | Lee et al. | 358/455 |
| 5,630,037 | 5/1997 | Schindler | 395/131 |

| 3 | 5 | 7 | 9 | 11 | 13 | 15 | 17 |
|---|---|---|---|---|---|---|---|
| 19 | 21 | 23 | 25 | 27 | 29 | 31 | 33 |
| 35 | 37 | 39 | 41 | 43 | 45 | 47 | 49 |
| 255 | 253 | 251 | 249 | 247 | 245 | 243 | 241 |
| 239 | 237 | 235 | 233 | 231 | 229 | 227 | 225 |
| 223 | 221 | 219 | 217 | 215 | 213 | 211 | 209 |
| 207 | 205 | 203 | 201 | 199 | 197 | 195 | 193 |

3 x 3 Min

FIG. 3

| 3 | 5 | 7 | 9 | 11 | 13 | 15 | 17 |
|---|---|---|---|---|---|---|---|
| 19 | 21 | 23 | 25 | 27 | 29 | 31 | 33 |
| 35 | 37 | 39 | 41 | 43 | 45 | 47 | 49 |
| 255 | 253 | 251 | 249 | 247 | 245 | 243 | 241 |
| 239 | 237 | 235 | 233 | 231 | 229 | 227 | 225 |
| 223 | 221 | 219 | 217 | 215 | 213 | 211 | 209 |
| 207 | 205 | 203 | 201 | 199 | 197 | 195 | 193 |

3 x 3 Max

| | | | | | | | |
|---|---|---|---|---|---|---|---|
| | 39 | | | | | | |
| | | | | | | | |
| | | | | | | | |
| | | | | | | | |
| | | | | | 231 | | |
| | | | | | | | |

FIG. 4

METHOD AND APPARATUS FOR SEPARATING FOREGROUND FROM BACKGROUND IN IMAGES CONTAINING TEXT

This is a continuation of application Ser. No. 08/380,732 filed Jan. 31, 1995, now abandoned.

FIELD OF THE INVENTION

The present invention relates generally to a method and apparatus for parameterized thresholding of gray-scale images to create binary black/white images corresponding to the foreground/background of the original gray-scale images, and more particularly to gray-scale images which contain text characters as the foreground. The invention includes a method and apparatus of determining and selecting the best quality binary image for instances where multiple sets of parameters have been used to create multiple binary images.

BACKGROUND OF THE INVENTION

In many applications, it is desirable to extract textual information from an image by automatic means. For example, using a machine to read address labels without manual intervention is a labor and cost saving technique. One technique for automatic label address reading employs a charge-coupled device ("CCD") camera to capture an image of the address label area. The n×m image provided by the CCD camera is called a gray-scale image, because each of the n×m pixels in the image can assume a gray value between zero and a maximum value, where zero is black, the maximum value is white and the intermediate values are gray. Typically, the maximum value will be 255 or 1023. For most address label reading application, the gray-scale image must be converted to a binary image, where pixels take on only one of two values, 0 for black and 1 for white. In the binary image, black pixels correspond to foreground, usually text, while white pixels correspond to background. The process of converting from a gray-scale image to a binary image is called thresholding. After the image has been thresholded, the label can be read automatically using an optical character recognition ("OCR") process.

Unfortunately, many common thresholding methods have great difficulty separating foreground from background on address labels due to the large variety of labels. Labels can have different color backgrounds, different color text printing, blurs, blotches, belt burns, tape effects, low contrast text, graphics, and plastic windows. Text on labels can be dot matrix, laser printed, typewritten, or handwritten and can be of any one of a number of fonts. The variety of labels makes it difficult for many thresholding processes to adequately separate foreground text from background and may cause many erroneous foreground/background assignments. An erroneous assignment occurs when a background pixel is assigned a value of 0 (black) or a foreground text pixel is assigned a value of 1 (white). If the former case, noise is introduced into the resultant binary image, and this may lead to difficulty reading the label automatically using OCR. In the latter case, text that was present in the gray level image is removed, and again the OCR process may fail.

In addition to the requirement for accuracy, an automatic thresholding technique must be fast and efficient to be effective as a cost-savings technique. In many applications, automatic label readers are employed by mail and package delivery services, where automatic systems convey packages at a rate of up to 3600 per hour. At this rate, a label must be imaged and processed in less than one second in order to be completed before processing on the next label must begin. In order for the thresholding technique to be used in real time, therefore, it must threshold the gray-scale image in considerably less than one second to give the OCR techniques time to process the thresholded text image.

Thus there is a need for a thresholding method and apparatus that employs a set of fast algorithms for separating foreground text from background in a way that minimizes the number of foreground/background misassignments. There is also a need for the thresholding method and apparatus to be adaptable so that it may adjust to the wide variety of character fonts and other differences in text presentation.

SUMMARY OF THE INVENTION

The invention is a method and apparatus of producing a high-quality thresholded binary image from a gray-scale image. In a preferred embodiment, the method is comprised of two stages. In the first stage, a number of candidate binary label images are generated from the original gray-scale image. Each candidate image is generated by applying a different set of thresholding process parameters to an intermediate image (the contrast image), which is constructed from the original gray-scale label image by using local and global contrast information. In the second stage, the candidate binary images are compared and the best quality binary image is selected. The invention is called Label Adaptive Thresholding ("LAT") because it adapts to many different kinds of labels and characters on the labels.

The method of constructing the intermediate contrast image corresponding to a gray-scale image comprises the steps of selecting a position (i,j) in the contrast image, where i denotes the row of the position in the contrast image and j denotes the column; finding the minimum gray-scale value, $MIN_{ij}$, of all the gray-scale image pixels in a rectangular window centered on the corresponding row-and-column position in the gray-scale image; finding the maximum gray-scale value, $MAX_{ij}$, of all the gray-scale image pixels in the same rectangular window; computing the local contrast $LC_{ij}$, of the gray-scale image by the formula $$LC_{ij} = C\,(1 - (MIN_{ij} + p)/(MAX_{ij} + p)),$$

where C is a preselected maximum contrast value and p is a preselected positive number small in comparison to C; and assigning a gray-scale value equal to $LC_{ij}$ to the (i,j) position of the contrast image; and repeating the above steps for each position which corresponds to a portion of the gray-scale image which is to be thresholded.

As part of the process of generating a candidate thresholded binary image, a minimum-allowable-contrast value is selected. The method of selecting this value comprises the steps of constructing a contrast histogram for all possible contrast values in the contrast image; finding all peaks in the contrast histogram greater than a preselected peak-floor-level value and separated from any higher peak by a preselected nominal-peak-width value; selecting from among the peaks found the minimum-text peak by locating the peak occurring at the lowest contrast value which is greater than a preselected minimum-contrast value; and obtaining the minimum-allowable-contrast value by subtracting a preselected nominal-text-peak-width value from the contrast value of the minimum-text peak. The preselected values for the peak-floor-level value, the nominal-peak-width value, the minimum-contrast value, and the nominal-text-peak-width value, along with the two cut-off values described below, comprise a set of thresholding process parameters.

Finally, a candidate binary image is constructed by assigning a 1 to each pixel in the background and a 0 to each pixel in the foreground. The pixels of a gray-scale image are divided between a background class and a foreground class by a method comprised of the steps of finding the minimum gray-scale value, MINij, of all the pixels in a rectangular window centered on the pixel; finding the maximum gray-scale value, MAXij, of all the pixels in the rectangular window; computing the local contrast LCij, by the formula $$LCij=C\ (1-(MINij+p)/(MAXij+p)),$$

where C is a preselected maximum-contrast value and p is a preselected positive number small in comparison to C; and assigning the pixel to the background class if LCij is less than a preselected minimum-allowable-contrast value. The previous steps are the same as those required for computing the contrast image; if the contrast image has been constructed, the steps need not be repeated.

For pixels not assigned to the background class by the comparison of the local contrast to the minimum-allowable-contrast value, the difference between MAXij and MINij is computed and the pixel is assigned to the background class if the max-to-min difference is less than a preselected minimum-contrast-scale value. If the pixel is still not assigned to the background class, the difference between MAXij and the gray-scale value of the pixel is computed and the pixel is assigned to the background class if the max-to-pixel-value difference is less than a preselected nominal-contrast-excess value. If the pixel is not assigned to the background class by the above steps, the pixel is assigned to the foreground class.

The invention envisions the use of two or more sets of thresholding process parameters, yielding two or more candidate binary images. To choose between any two candidate binary thresholded images of an original gray-scale image, the invention uses a method comprising the steps of converting the portions of the binary images corresponding to the foreground into a run-length-encoded (RLE) image; determining the numbers and sizes of the pieces (i.e., the piece size distribution) of the RLE images using piece extraction; constructing histograms of the piece size distributions of the RLE images; and using the histogram for statistical or neural network analysis to select one of the two binary images. If there are more than two binary images, this method is applied pairwise until all binary images save one have been eliminated. The use of RLE images is optional, but their use greatly reduces the processing time over the technique that determines the piece size distributions from the binary images in positional representations.

The piece size distribution of a binary image is a specification of the number of pieces by size for pieces of each said binary image having one or the other of the two values of the binary image. The piece size distribution may be used for simple comparisons of two binary images even where no quality selection is involved.

It is thus an object of this invention to provide a method and apparatus for quickly thresholding a gray-scale image.

It is a further object of this invention to provide a method and apparatus which uses local contrast information in a gray-scale image to unambiguously identify text in the image.

It is a further object of this invention to provide a method and apparatus to select the binary image that best represents text in the foreground and non-text in the background from among two or more candidate binary images which were thresholded from an original gray-scale image containing text.

It is a further object of this invention to automatically process labels with poor readability to generate a high-quality binary image for OCR input.

The present invention meets these objects and overcomes the drawbacks of the prior art, as will be apparent from the detailed description of the embodiments that follow.

BRIEF DESCRIPTION OF THE DRAWINGS

FIG. 3 depicts a sample set of pixel values for a gray-scale image and illustrates the construction of the MIN image.

FIG. 4 depicts a sample set of pixels values for a gray-scale image and illustrates the construction of the MAX image.

DETAILED DESCRIPTION OF THE PREFERRED EMBODIMENTS

Figure 1:
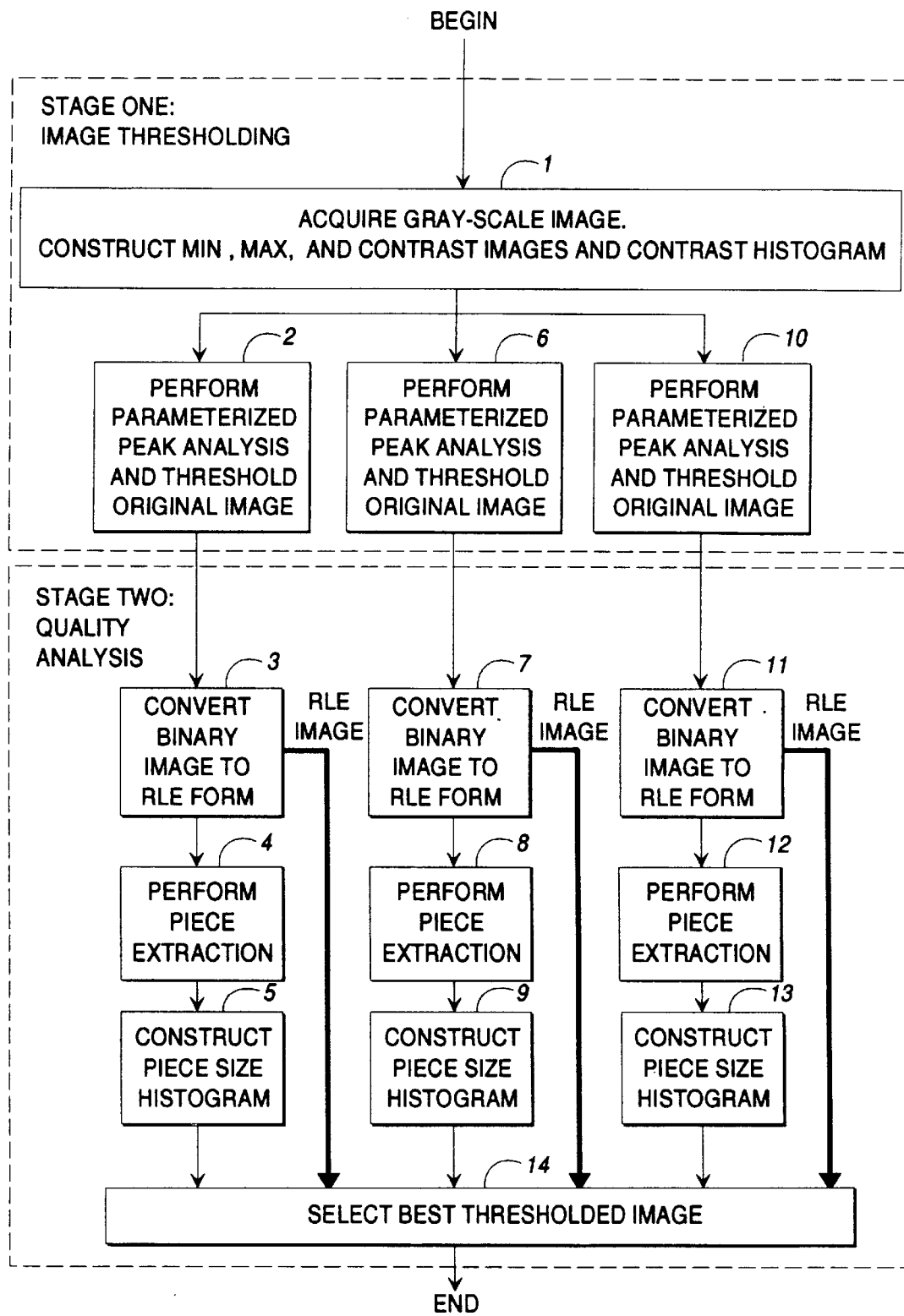
FIG. 1 depicts the major steps and data flow of an embodiment of the method of the invention.
Figure 2:
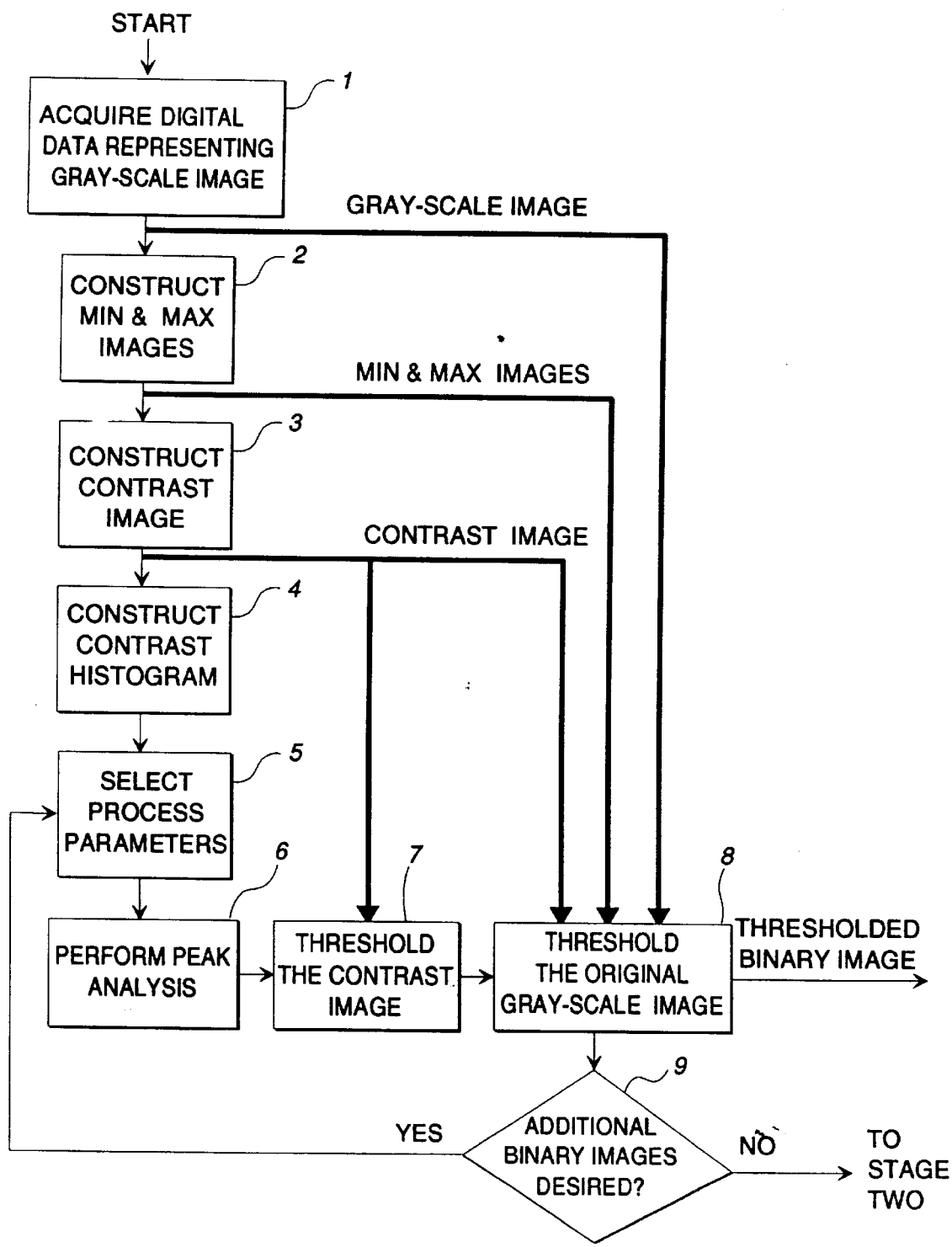
FIG. 2 depicts the major steps and data flow associated with the thresholding technique of an embodiment of the method of the invention.

FIG. 1 is a block diagram of the overall process and data flow of an embodiment of the invention. FIG. 2 is a block diagram of the major steps and data flow in stage one of an embodiment of the invention. In block 1 of FIG. 1, stage one of the process begins when digital data is acquired which represents a gray-scale image. The gray-scale image has n×m pixels representing n rows and m columns of pixels, each having a gray-scale value from 1 to the maximum provided by the device which generates the image. Preferably, the device is a CCD camera and the pixel's gray values vary from 0 (black) to 255 (white). Also, in block 1 of FIG. 1, three separate n×m pixel images are constructed from the gray-scale image: the MIN image; the MAX image; and the contrast image. The pixel at row i and column j in the MIN image contains the minimum gray-scale value in a small region, preferably a rectangular box, around row i and column j of the gray-scale image. In this specification, row i and column j of a image will also be called the (i,j) position of an image. The MAX image is similarly constructed using maximum values instead of minimum values. The pixel at the (i,j) position of the contrast image is computed algebraically from the values in the (i,j) positions in the MIN and MAX images. In addition, a histogram of the values in the contrast image is computed. These steps are shown in greater detail in blocks 1 through 4 of FIG. 2. As shown in block 2 of FIG. 1 and block 6 of FIG. 2, peak analysis using one set of thresholding parameters is performed on the contrast histogram. The results of the peak analysis are used to select a minimum contrast value, so that, as shown in block 7 of FIG. 2, the contrast image can be thresholded. As shown in block 8 of FIG. 2, the thresholded contrast image is used in conjunction with the original gray scale image, the MIN image, the MAX image and the contrast image itself to yield a binary image.

FIG. 2 also shows the data flow associated with the construction and use of the various intermediate constructions of the method, such as the MIN, the MAX, and the contrast images and the contrast histogram. The data generated in one step of the method may, if necessary, accompany the processing from one method step to the next method step. For example, construction of the MIN, the MAX, and the contrast images is necessary to form the contrast histogram and to conduct the histogram peak analysis in accordance with the invention. However, once these three images are constructed, they may be used again in the final steps of peak analysis and thresholding the original gray-scale image. The thick lines of FIG. 2 show how the data for the original gray-scale, the MIN, the MAX, and the contrast images are made available for use by later steps in the method. Recognition of the dual use of these intermediate images and design of the thresholding method to re-use the intermediate images, rather than re-constructing them, is an important part of the time savings and speed achieved by the invention.

Stage two of the invention begins with the binary images produced in stage one. FIG. 1 depicts a preferred mode of operation where three sets of thresholding process parameters are used to generate three thresholded binary images. If it is desired to use additional sets of process parameters, the steps represented by blocks 2 through 5 of FIG. 1 would be repeated for each set of process parameters.

Each binary image is converted to run-length-encoded (RLE) form in block 3, 7, and 11 of FIG. 1. Next, in blocks 1, 8, and 12, piece extraction is performed to determine the number and size of the connected components. In blocks 5, 9, and 13 a histogram of the piece size distribution is constructed for each image. In block 14, the piece size histograms and the RLE images are used to select the highest quality binary image. The thick lines in FIG. 1 show the data flow associated with providing the RLE data for each binary image directly to the final step in block 14, in addition to the normal data flow from one method step to the next.

Figure 12:
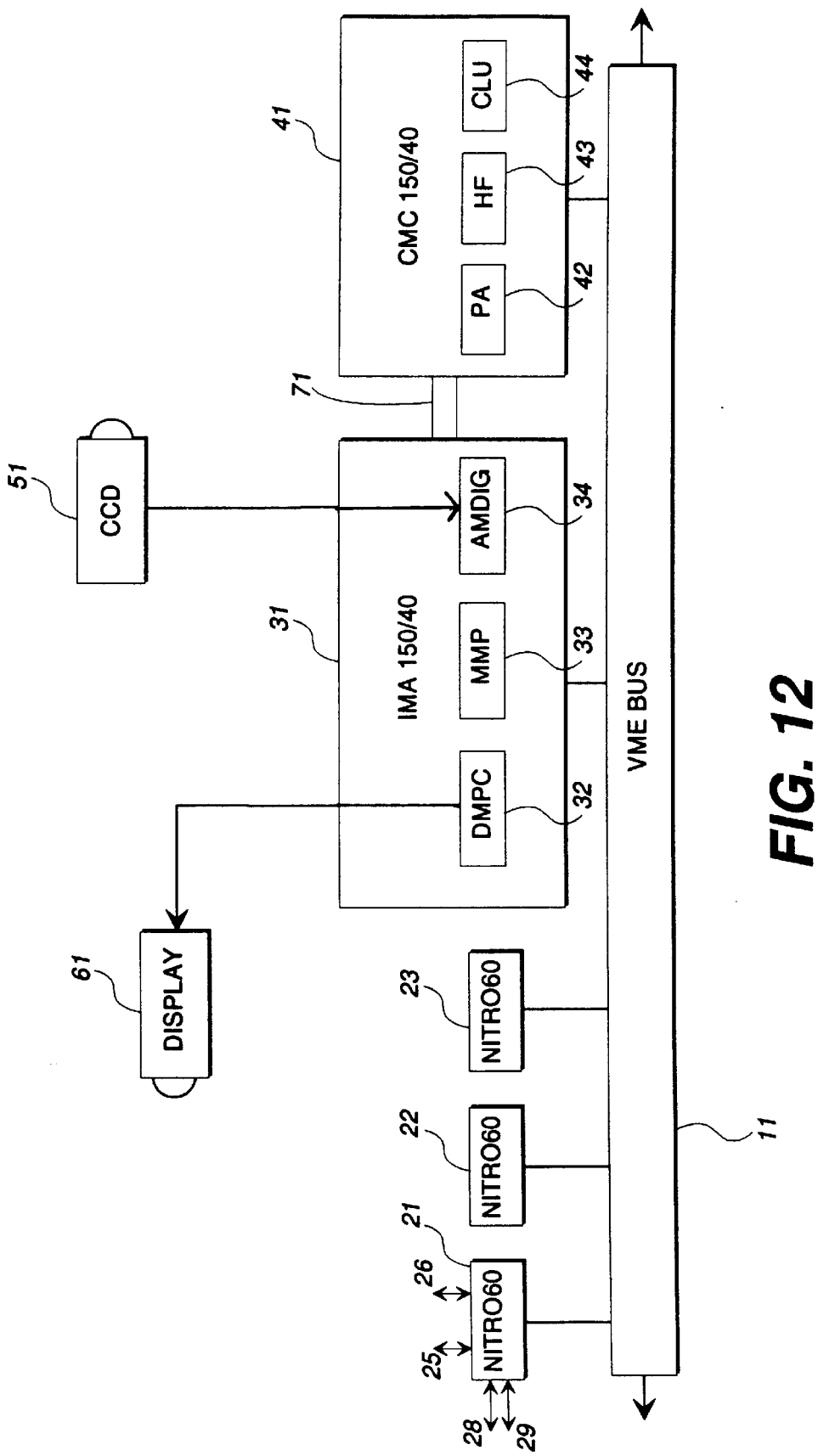
FIG. 12 is a block diagram of the major components of a preferred embodiment of the apparatus of the invention.

The method of the invention may be implemented on a pipeline processor for highest speed. Preferably, the pipeline processor employs a selection of 150/40 processing modules from Imaging Technology, Inc. The 150/40 modules may be interconnected via a VME bus, as depicted in FIG. 12. One or more general processors 21, 22, and 23, such as the Nitro60 processor sold by Heurikon Corporation, may also be connected to the VME bus. An image manager 31, such as the IMA 150/40 module sold by Imaging Technology, Inc., and a computational module controller 41, such as the CMC 150/40 module, also sold by Imaging Technology, Inc., may also be connected to the VME bus. The method of the invention may be coded in the C language and cross-compiled for installation on the Nitro60 processors 21, 22, and 23 and the other processing modules on the VME bus. One Nitro60 processor 21 may have a mouse-control line 25 and a RS232 port 26 to provide operator control over the system. One Nitro60 processor 21 may also have data ports such as a SCSI-2 port 28 and a Ethernet port 29. The IMA 150/40 module 31 preferably provides four megabytes of memory for storing up to four 1024×1024 images and provides overall timing control to the pipeline hardware. The IMA 150/40 module 31 also allows up to three daughter boards, 32, 33, and 34, discussed below. The CMC 150/40 module 41 operates as a pipeline switching module, allows up to three daughter boards, 42, 43, and 44, and routes images to and from any daughter boards. The IMA 150/40 module 31 and the CMC 150/40 module 41 are separately interconnected via a pixel bus 71.

Three daughter boards are mounted on the IMA 150/40 module 31. The AMDIG daughter board 34 receives gray scale image data from the CCD camera, preferably a Kodak™ Megaplus 1.4 camera, and routes the image data to an appropriate area of memory in the IMA 150/40 module 31. The AMDIG daughter board 34 can also scale the input image data if desired. The DMPC daughter board 32 can provide a display of any image via a RGB high-resolution monitor 61. The MMP daughter board 33 is a morphological processor which automatically provides the MAX and MIN images when provided with a gray-scale image and a rectangular box size. Three additional daughter boards are mounted on the CMC 150/40 module 41. The HF daughter board 43 is a histogram and feature extractor which automatically provides a histogram of 256 bins when provided with a binary image. The feature extractor may also be used to automatically generate RLE images. The CLU daughter board 44 is a convolver and logical processor which automatically provides the contrast image. The PA daughter board 42 is a separate digital signal processor which operates asynchronously as a co-processor in parallel with the pipeline processing. This daughter board is used to provide the quality-estimating method: receiving multiple RLE images, selecting the best RLE image, and providing the data for the best RLE image to one of the Nitro60 processors 21, 22, and 23 for OCR processing. The entire hardware configuration FIG. 12 operates at the speed of 40 megapixels per second, which implies that a one megabyte image (1024×1024 pixels) requires approximately 28 milliseconds for processing. At this speed, less than 0.5 seconds is required to construct three parametric thresholdings of a single 1024×1024 gray scale image and to select the best quality binary thresholded image for OCR processing.

The method of the invention may also be implemented on any digital computer having sufficient storage to accommodate the original gray-scale image, the intermediate processing images (the MIN, the MAX, and the contrast images), and at least two binary thresholded images. Programming of the method on a digital computer may be carried out in the C language or any comparable processing language.

From this overview, we now describe the entire method in detail. At a given location (i,j) in the gray-scale label image, local contrast is obtained by the following procedure:

Step 1. Find the minimum gray level value ($MIN_{ij}$) in a k×k window centered at (i,j).

Step 2. Find the maximum gray level value ($MAX_{ij}$) in the same window.

Step 3. The local contrast LC at (i,j) is computed as:

$$LC_{ij} = C \times (1 - (MIN_{ij} + p)/(MAX_{ij} + p))$$

The value C is chosen based on the desired maximum local contrast value. For high contrast gray-scale images, a smaller value of C may be sufficient to differentiate between foreground and background. For low contrast gray-scale images, more differentiation in contrast may be necessary to select between foreground and background. A value of 255 for C is preferred. This value works for most gray-scale images and allows the values of the contrast image to be stored one per 8-bit byte. The value p is selected to be positive and small in comparison to C. Its primary role is to protect against dividing by zero and it should be selected to facilitate rapid computation of the local contrast value. A preferred value of p is one.

The formula above for local contrast leads to a large local contrast $LC_{ij}$ when there is a large difference in a gray level between the minimum and maximum pixel in the k×k window. The local contrast value can vary from 0–C, where 0 is minimum contrast, and C is maximum contrast. It is not necessary that the maximum contrast value be the same as the maximum possible pixel value in the original gray-scale image. However, the preferred maximum contrast value is 255, and this value will is used in the remainder of the detailed description.

A new image is created, called the contrast image, that contains the local contrast information. For each gray-scale pixel at (i,j) in the original label image, a corresponding pixel in the contrast image is set equal in value to $LC_{ij}$. Each pixel in the contrast image is thereby assigned a value between zero and the maximum contrast. Similarly, the two other new images are created, the MIN image and the MAX image. The pixel in the (i,j) position of the MIN image has the value $MIN_{ij}$ and the pixel in the corresponding position in the MAX image has the value $MAX_{ij}$.

The window size parameter, k, is determined by finding the maximum allowable stroke width for a text character. For example, at 250 dots per inch, an 8 point font character has a stroke width of about 3 pixels. At the same resolution, an 18 point font character has a stroke width of about 14 pixels. The value k is then set slightly larger than this maximum allowable width. For example, to have high text contrast values for a label with an 18 point font, the dimension k of the window must be greater than 14 pixels. If the dimension is smaller than this amount, a very low contrast value will be obtained for pixels that are in the center of a character stroke, because all the gray-scale values within the centered k×k window will be almost equal. For some applications or character fonts, it may be preferable to use a rectangular window of size k×j, where k and j have different values. A preferred window size is a square of 15 pixels by 15 pixels. This window size will allow processing of characters in any rotational orientation up to a font size of 18 points.

Figure 5:
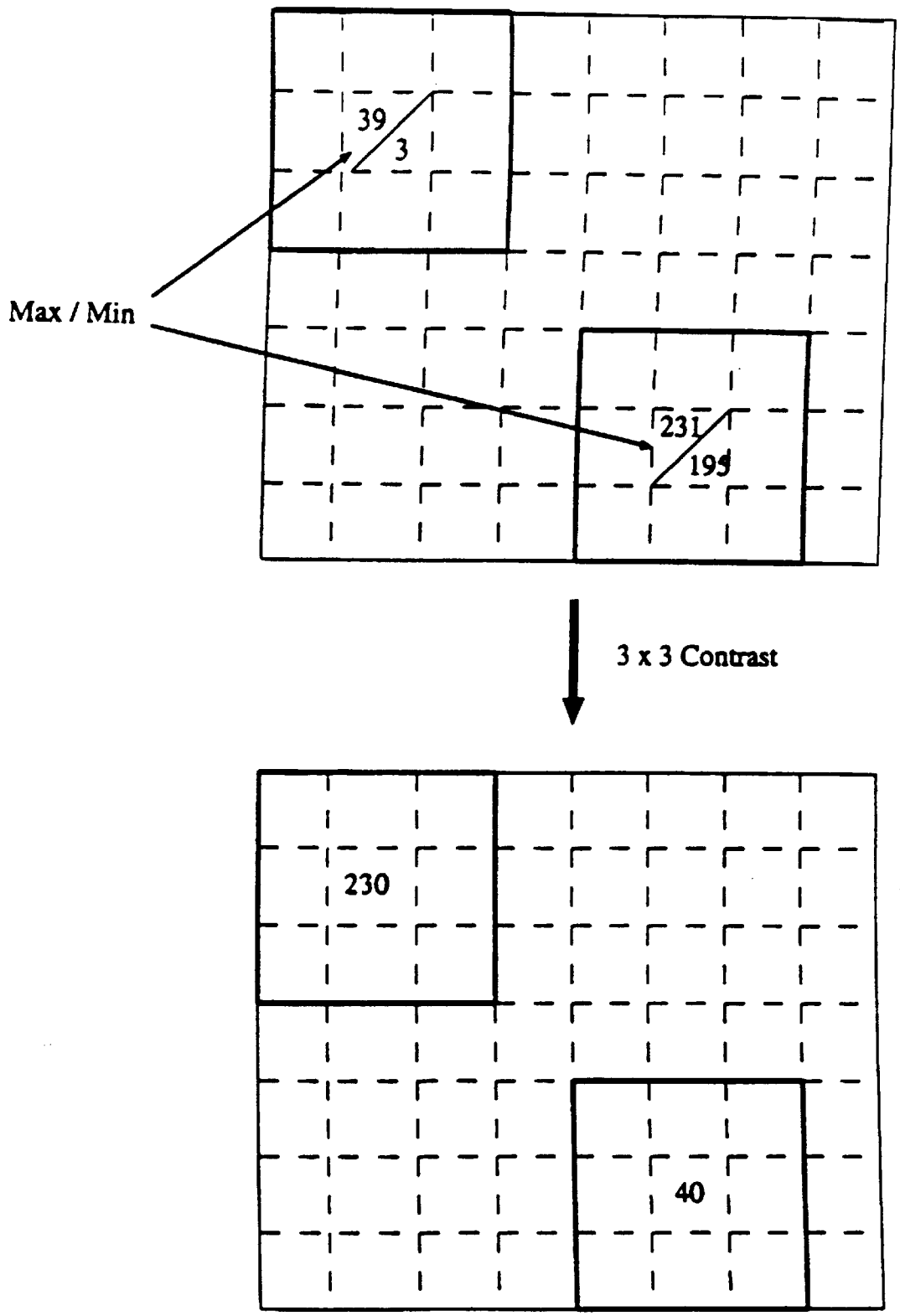
FIG. 5 illustrates the construction of the contrast image from the MIN and MAX images.

Examples showing the derivation of the pixel values for the MIN, MAX, and contrast images are shown in FIGS. 3, 4, and 5. In all three cases, a square window size is used and k is chosen to have a value of 3. In FIG. 3, the original gray-scale image pixel values are shown at the top portion of the Figure in the upper left corner, the minimum pixel value of "3" in a 3×3 square around the (2,2) position determines the (2,2) position of the MIN image to have a value of "3." Similarly, the (6,6) position of the MIN image is determined to be a "195." At the edges of the gray-scale image, the window will include areas off the gray-scale image. The pixel value for any area off the original image is considered to be zero.

In FIG. 4, the (2,2) position of the MAX image is seen to have a value of "39," while the (6,6) position has a value of "231." FIG. 5 illustrates how the derivation of the MIN and MAX images leads directly, through algebraic computation, to the contrast image.

To construct the contrast histogram, a set of 256 bins is created, each corresponding to one of the contrast levels (0–255). Each pixel in the contrast image is examined in turn, and the bin corresponding to the pixel value is increased by one. This forms the contrast histogram, which is a count of the number of pixels in the image that have pixel values at each gray level. An example of a contrast histogram is presented in FIG. 6.

Peaks in the contrast histogram correspond to parts of the gray-scale label image that have similar contrast. In general, these parts, or contrast segments are similar types of text, graphics, or noise. Peak analysis is the process of determining which peaks corresponds to contrast segments that are text, and which peaks correspond to contrast segments that are background or noise. The result of peak analysis will aid in the correct assignment of 0 (black) for text pixels, and 1 (white) for background or noise pixels.

The underlying assumption in the peak analysis process is that, for a given label, the contrast value for contrast segments corresponding to background pixels and noise pixels is on the average lower than the values for foreground/text pixels. However, there are a number of difficulties that occur due to the variety of labels. These difficulties are enumerated as follows:

1. The number of contrast segments is variable. Therefore, the number of contrast peaks in the contrast histogram is variable. This also means that there may be several background or noise peaks, as well as several text peaks.
2. The average contrast value for a contrast segment is variable. Therefore, the location of contrast peaks in the contrast histogram is variable.
3. The number of pixels in a contrast segment is variable. Therefore, the height of a contrast peak in the contrast histogram is variable.
4. The distribution of contrast values around the average contrast value in a contrast segment is variable. Therefore, the width of a contrast peak in the contrast histogram is variable.

Given a contrast histogram with several peaks of various heights, widths, and locations, the goal of peak analysis is to find a contrast value called the minimum allowable contrast such that any pixel having a contrast value below this value will be automatically assigned a value of 1 (background or noise).

Figure 6:
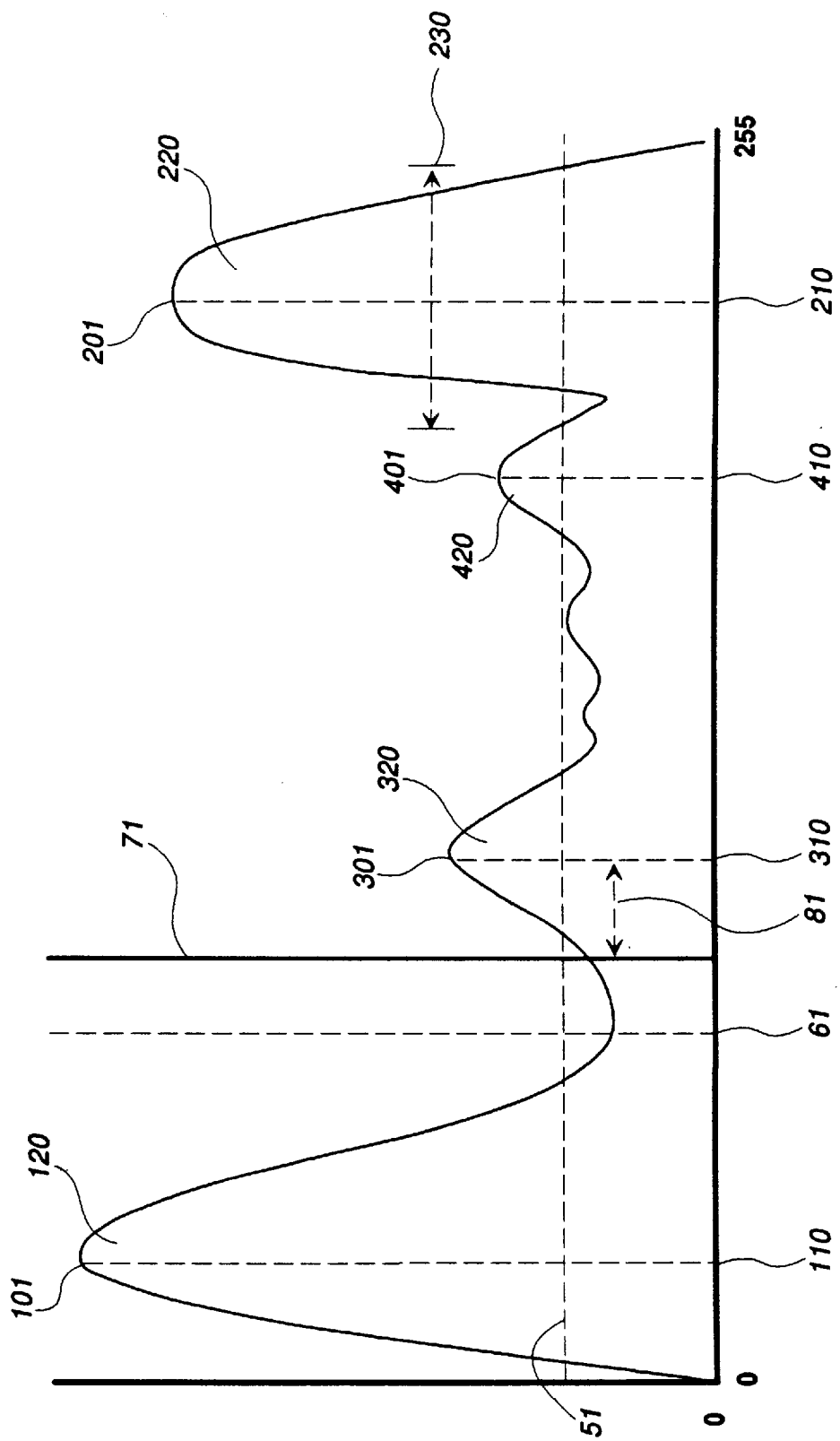
FIG. 6 depicts a typical contrast histogram and illustrates the various thresholding process parameters associated with an embodiment of the method of the invention.

To accomplish this task, a set of thresholding process parameters are used for analyzing the contrast histogram. These parameters are: (1) Peak Floor Level, (2) Minimum Contrast Value, (3) Nominal Peak Width, and (4) Nominal Text Peak Width. The parameters are illustrated in FIG. 6.

Peak Floor Level is the minimum height that a contrast histogram peak may have. Any contrast histogram peaks that are below the Peak Floor Level are not considered to correspond to possible text contrast segments. Typically, the Peak Floor Level will vary from 800 to 1200, and is preferably set to 1100 for an image which is 1024×1024 pixels in size.

Minimum Contrast Value is the minimum value a contrast pixel may have and still be considered part of a text contrast segment. Preferably, it has a value of 25 to 75 when C has a value of 255.

Nominal Peak Width is the number of different contrast values that are expected to be in a nominal contrast histogram peak. Preferably, it has a value of 50 to 75 when C has a value of 255.

Nominal Text Peak Width is the number of different contrast values that are expected to be in a nominal contrast histogram peak that corresponds to a text contrast segment. Preferably, it has a value of 25 to 75 when C has a value of 255.

The peak analysis process for the contrast histogram is a process for enabling the thresholding of the contrast image by determining a minimum allowable contrast. This process is as follows:

Step 1. Peak search: Find the contrast histogram contrast value with the greatest number of pixels. This is the largest current peak.

Step 2. Peak evaluation: If the peak height is not larger than Peak Floor Level, go to step 6. The peak is disallowed because it is too short.

Step 3. Peak storage: Store the peak contrast value.

Step 4. Peak inhibition: Disallow peak search within Nominal Peak Width of this peak, and all previous peaks.

Step 5. Go to step 1.

Step 6. Peak selection: Find the stored peak that is located at the smallest contrast value greater than Minimum Contrast Value. This is called the minimum text peak.

Step 7. Threshold Determination: Subtract Nominal Text Peak Width from the contrast value of the minimum text peak. This is the minimum allowable contrast.

Application of the peak analysis process to the contrast histogram shown in FIG. 6 results in the identification of three text peaks: Peak 2, Peak 3, and Peak 4. Peak 3 is the minimum text peak. Identification of Peak 3 allows the determination of the minimum allowable contrast, as shown in FIG. 6.

Once the minimum allowable contrast is determined, the original gray-scale image can be thresholded. Given the pixel at (i,j) in the original image, its $MIN_{ij}$, $MAX_{ij}$ and $LC_{ij}$ values, the following steps are taken to determine if the pixel is foreground (text) or background:

Step 1. Is $LC_{ij}$ greater than the minimum allowable contrast? If not, the pixel at (i,j) is labeled background.

Step 2. Is $MAX_{ij}-MIN_{ij}$ sufficiently large? If not, the pixel at (i,j) is labeled background. To implement this test, the difference $MAX_{ij}-MIN_{ij}$ is compared to a first cutoff value, called the Minimum Contrast Scale. If this difference is less, the pixel is labeled background. Preferably, the Minimum Contrast Scale value is between 20 and 32 when C has a value of 255.

Step 3. Is the pixel at (i,j) much closer to $MIN_{ij}$, or closer to $MAX_{ij}$? If sufficiently closer to $MAX_{ij}$, the pixel at (i,j) is labeled background. To implement this test, the difference $MAX_{ij}$-(value of the pixel at (i,j)) is compared to a second cutoff value, called the Nominal Contrast Excess. If this difference is less, the pixel is labeled background. Preferably, the Nominal Contrast Excess value is midway between $MIN_{ij}$ and $MAX_{ij}$, i.e. $(MIN_{ij}+MAX_{ij})/2$.

Step 4. If the pixel at (i,j) has not been labeled background by any of the above three tests, then the pixel is labeled foreground (text).

The thresholding of the gray scale image with a specific set of parameters completes the first stage of processing. The performance of stage one is dependent on the selection of an adequate set of thresholding process parameters. The set of parameters specified above produces satisfactory results for a wide variety of labels. It is difficult, though, to find a single set of parameters that produces satisfactory results for the entire variety of labels that may be encountered in any given environments. However, with a method of choosing between multiple sets of process parameters, it is possible to find two or three sets of parameters that cover almost all possibilities. Three sets of process parameters are given in Table 1 and are used in conjunction with Example 1, discussed below.

To threshold a given gray scale image with a set of processing parameters, it is preferable to preselect the parameter values to be used. As can be appreciated from the above description of the thresholding steps, the term "preselected" means not only the preselection of constant values but also the preselection of formulae which may be used to determine the values in question.

If a label image is processed by the LAT method and apparatus several times, each time with a different set of process parameters, a set of thresholded label images will be the result. It then becomes necessary to automatically judge which thresholded image of the set is the best, i.e., has the highest quality for OCR processing. The second stage of the invention, Quality Analysis, supplements the stage one processing described above and provides the necessary judgment to choose the best thresholded image.

The Quality Analysis process has the following major steps:

Step 1. Generate n thresholded images using n sets of process parameters.

Step 2. Convert each binary image to a Run-Length Encoded (RLE) image.

Step 3. Perform piece extraction on each RLE image and determine the number and size of connected components in the image.

Step 4. Using statistical information, determine pairwise which of two images has the higher quality, based on the distribution of piece sizes in each of the two images.

Step 5. Using the image selected in step 4 with any other image not yet compared, repeat step 4. Continue until all images have been compared to select the thresholded image with the highest quality.

In step one, stage one of the LAT method is performed n times to produce n images, each with a different set of process parameters. Each binary image thus produced is run-length encoded. Run-length encoding (RLE) is a process that transforms a binary pixel image to another representation. In this representation, each horizontally connected group of black pixels, called a run, is transformed to RLE format by retaining only the start pixel location for the run, and the length of the run. All runs are transformed in this manner. RLE is a standard image processing technique.

Figure 7:
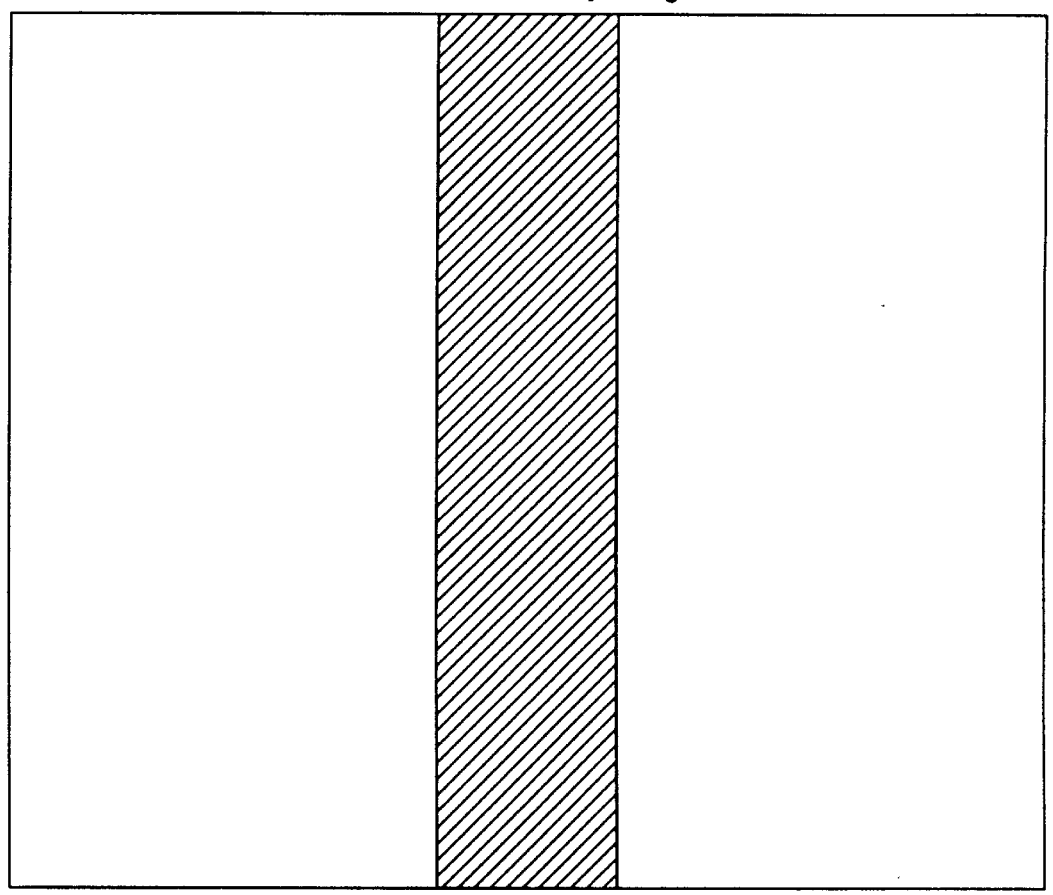
FIG. 7 depicts an example binary image to illustrate the reduction in representational data resulting from converting the binary image to run-length-encoded (RLE) format.

The RLE transformation tends to reduce the size of the image significantly, without reducing the quality of the binary image. For example, the image in FIG. 7 is a 100×100 binary image and normally requires storage of 10,000 bits. However, since it contains only a vertical bar (of height 100 pixels, and width of 3 pixels), it can be represented in RLE format by 100 start bytes, each with 1 length bytes (of value 3). Therefore, this image only requires storage of 200 bytes in RLE format. Some algorithms have been shown to take less execution time due to the nature of this format, as well as the smaller representation.

Next, each RLE image is subjected to piece extraction. Piece extraction is a standard image processing technique for finding runs that are touching on different lines of the images. Runs that touch are called connected components. By assembling groups of connected runs, pieces are formed. For example, a piece can be a typewritten character or a blotch of noise.

With the statistical information thus assembled, the image with the best quality can be selected. Quality estimation is a method for examining the results of the LAT process and judging which threshold is the best among a group of images. This process uses the size of pieces (i.e., number of pixels in a piece) generated by the piece extraction algorithm to estimate quality.

Piece size is a very useful feature to examine because it provides good representation of the quality of text-based images such as labels. The underlying assumption is that the distribution of piece sizes provides information on the amount of noise and text that is found in a thresholded image. Images with a lot of tiny pieces tend to be noisy. Images with many large pieces tend to have high quality text. Oftentimes, images have some measure of pieces of many different sizes.

The invention uses a histogram of the piece sizes as the feature set for quality estimation. The range of piece sizes is divided into b bins. Each bin contains the number of pieces in the images that within the size range of the bin. A decision making process is used to examine the histogram to determine if the image is of better quality than any of the other thresholded images. Two different decision processes have been developed for performing this examination:

1. The first decision process uses a histogram of two bins. Bin 1 (Noise) contains small pieces between 0 and 10 pixels in size. Bin 2 (Big) contains big pieces with size greater than 100 pixels. Label the images so that the image with more big pieces is labeled with the number 1, i.e., Big(1)>Big(2). The following comparison/selection is made pairwise for two thresholded images, Image(1) and Image(2):

$$\text{Step 1. If Big(2)} < 30, \text{ then select Image(1)}$$

$$\text{Step 2. If } Q \times \frac{\text{Big(1)}}{\text{Big(2)}} > \frac{\text{Noise(1)}}{\text{Noise(2)}}, \text{ then select Image(1);}$$

otherwise, select Image(2).

$$\text{If } 30 \leq \text{Big(2)} \leq 150, Q = \frac{(-2)(\text{Big(2)}) + 60}{120} + 3$$

$$\text{If } 150 > \text{Big(2)}, Q = 1$$

For more than two images, the algorithm is applied pairwise until a suitable selection is made.

2. The second decision process uses a piece size histogram of four bins as follows:
   Bin 1: 0–10.
   Bin 2: 11–40.
   Bin 3: 41–100.
   Bin 4: more than 100

Bin 1 corresponds to small pieces (image noise) and Bin 4 corresponds to big pieces of the image. Bin 3 corresponds to disconnected big pieces such as may be encountered in an image of text produced by a dot-matrix printer.

The values in these bins can be considered as the components of a four-dimensional vector. Quality analysis may then be performed on two images, Image(1) and Image(2), with a feedforward neural network with eight inputs. The eight inputs are, in order, the values in the four bins from Image(1) and the values in the four bins from Image(2). The eight input network produces a value between 0–255 as output. The network is trained on a large set of training images using the back propagation algorithm.

To train the network, the large set of training images are examined pairwise and the better image of each pair is selected by visual inspection. The neural network is trained by specifying an output of 255 when the vector values for the better image appear first in the 8-component input vector, then reversing the two four-component vectors in the input and specifying a neural network output of 0. This training process is repeated for a large number of pairs of the training images.

After training, the network functions as follows: For a given input pair of images, Image(1) and Image(2), the two four-component vectors from the piece size histogram are provided as input to the neural network. If the output value of the network is greater than 128, Image(1) is better than Image(2). Otherwise, Image(2) is better. For more than two images, the algorithm is applied pairwise until a suitable selection is made.

Other mechanisms for estimating quality can also be employed using the histogram of piece sizes. For example, one such mechanism employs a peak detection algorithm similar to the one in the first stage of the LAT process to find text and noise piece segments. For another example, neural networks can be used with only selected bins of the piece size histograms being used as inputs.

EXAMPLE

Figure 8:
FIG. 8 depicts a gray-scale image of a specimen label.
Figure 9:
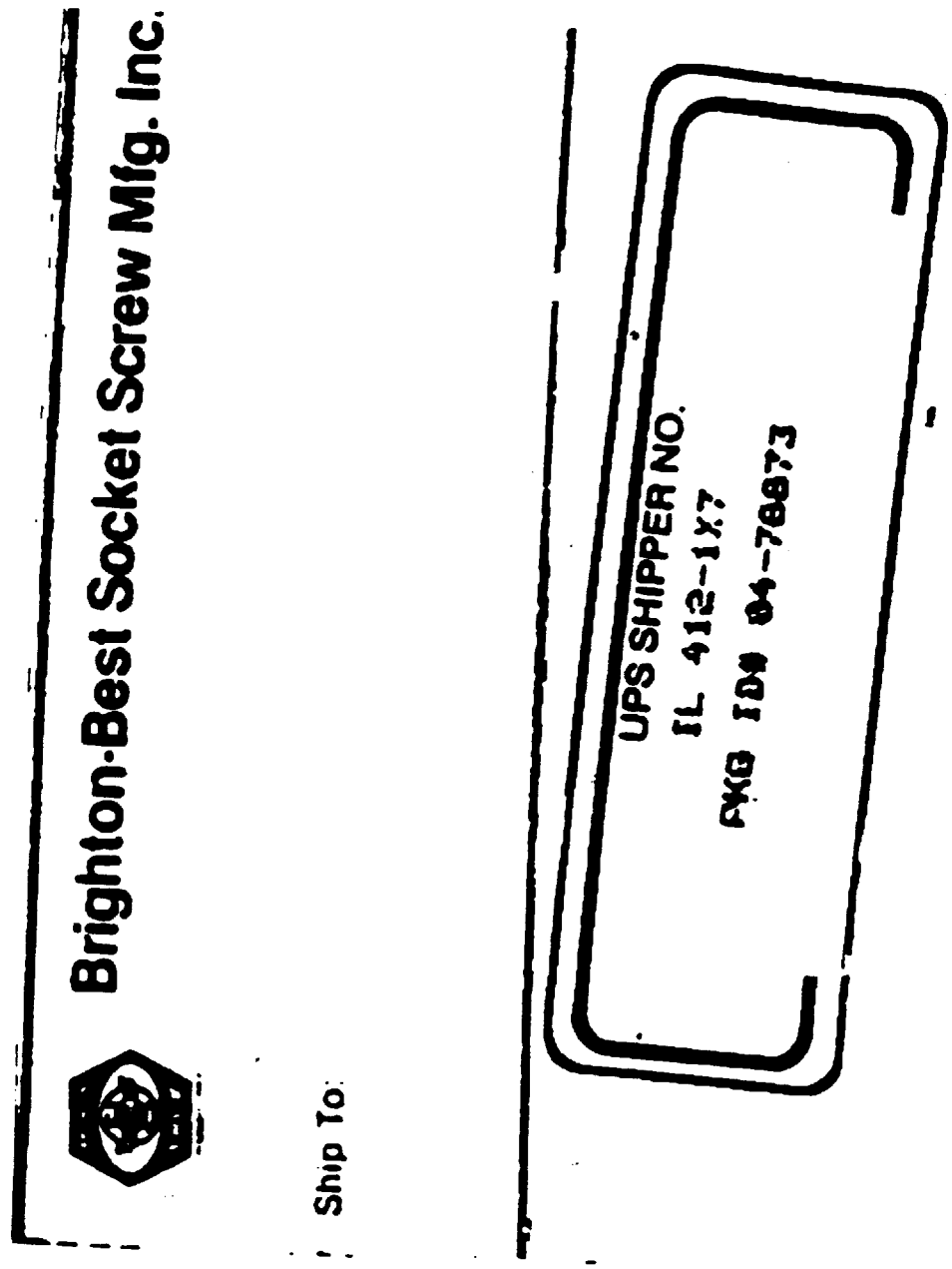
FIG. 9 shows a thresholded, binary image of the gray-scale image in FIG. 8, using one set of thresholding parameters.
Figure 10:
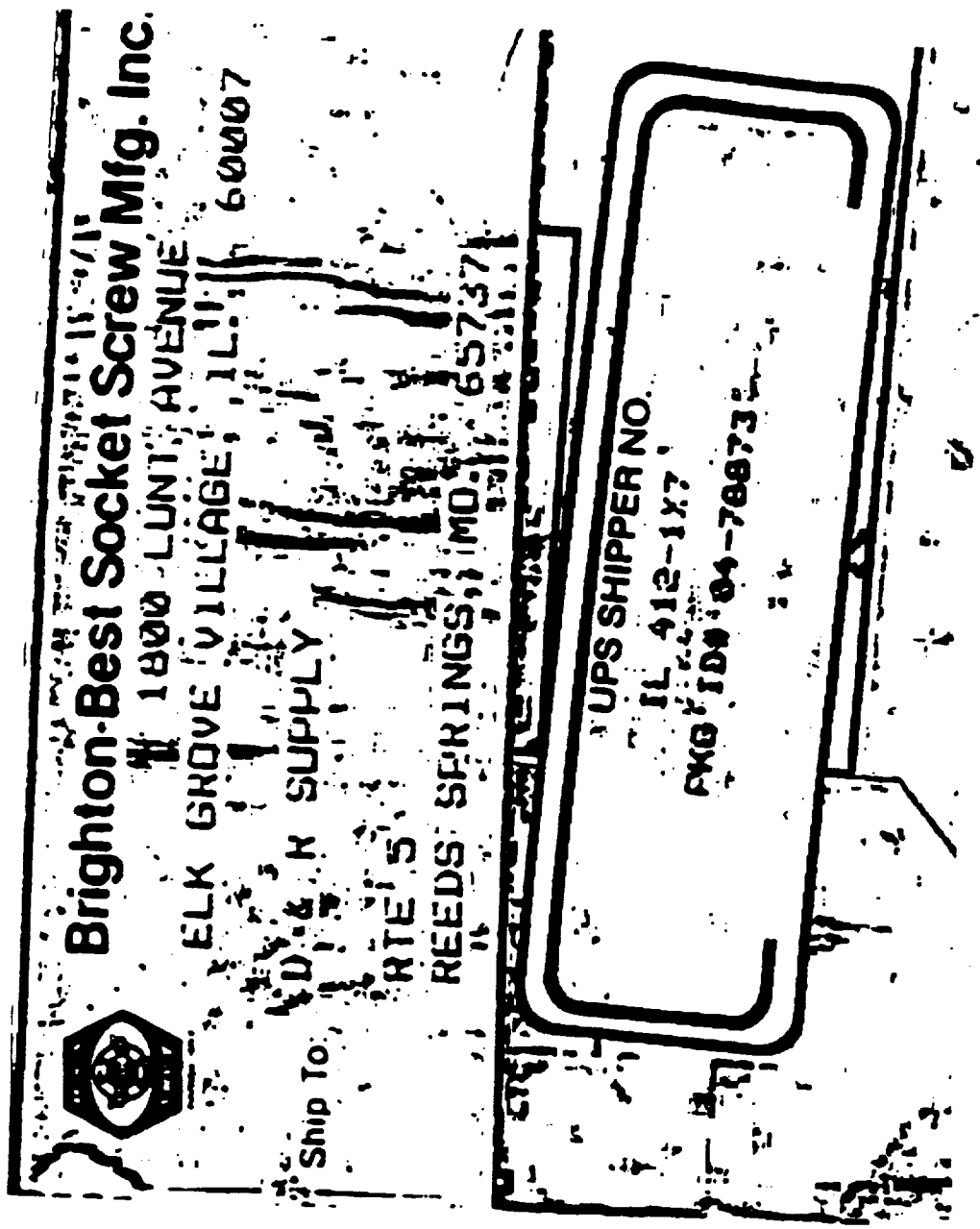
FIG. 10 shows a thresholded, binary image of the gray-scale image in FIG. 8, using a second set of thresholding parameters.
Figure 11:
FIG. 11 shows a thresholded, binary image of the gray-scale image in FIG. 8, using a third set of thresholding parameters.

FIGS. 8–11 illustrate the use of the invention with a sample label. FIG. 8 depicts the original gray-scale image of a specimen label. FIG. 9 shows a thresholded, binary image of the image in FIG. 8, using the parameters in column 1 of Table 1. Note that, while all background has been set to white, some of the text is missing. FIG. 10 shows a thresholded, binary image of the gray-scale image in FIG. 8, using the parameters in column 2 of Table 1. Here, all of the text is present, but some of the background, corresponding to wrinkles in the label, have been set to foreground black. FIG. 11 shows a thresholded, binary image of the gray-scale image in FIG. 8, using the parameters in column 3 of Table 1. Here, all of the text is present, and all of the background has been set to white. This last binary image is, from visual inspection, clearly the best quality image of the three binary images shown in FIGS. 9, 10, and 11. When these three binary images were subjected to the first method of quality analysis, the last image, corresponding to FIG. 11, was selected.

TABLE 1

| | Process Parameters | | |
|---|---|---|---|
| Parameter Set | 1 | 2 | 3 |
| Peak Floor Level | 1100 | 1100 | 1100 |
| Nominal Peak Width | 75 | 25 | 75 |
| Minimum Contrast Value | 75 | 50 | 50 |
| Nominal Text Peak Width | 75 | 75 | 25 |
| Minimum Contrast Scale | 32 | 20 | 20 |
| Nominal Contrast Excess | (MINij + MAXij)/2 | (MINij + MAXij)/2 | (MINij + MAXij)/2 |

The selection of the last image, corresponding to FIG. 11, as the best quality thresholded binary image can be illustrated by reference to Table 2, which contains the values for the Noise bin and Big bin of the piece-size histogram.

TABLE 2

Number of small and large size binary image pieces.

| Image | Corresponding Figure | Noise | Big |
|-------|---------------------|-------|-----|
| A | 9 | 95 | 30 |
| B | 10 | 1884 | 70 |
| C | 11 | 109 | 52 |

The quality analysis process first compares images A and B. Since image B has more big pieces, it is labeled image 1 and image A is labeled 2. The value of Q in this instance is $$Q = \frac{(-2)(\text{Big}(2)) + 60}{120} + 3 = \frac{-2(30) + 60}{120} + 3 = 3$$

The test for the better quality image is $$Q \times \frac{\text{Big}(1)}{\text{Big}(2)} = \frac{3(70)}{30} = 7$$

which is not greater than Noise(1)/Noise(2)=1884/95, so image 2 (image A) is selected.

Next, image A is compared to image C. In this case, image C is labeled image 1. The value Q is again computed to be 3. The test for the better quality image is therefore $$Q \times \frac{\text{Big}(1)}{\text{Big}(2)} = \frac{3(52)}{30} = 5.2$$

which is greater than Noise(1)/Noise(2)=109/95. Hence image 1 (image C), corresponding to FIG. 11, is selected as the best image of the three.

While this invention has been described in detail with particular reference to preferred embodiments thereof, it will be understood that variations and modifications can be made to these embodiments without departing from the spirit and scope of the invention as described herein and as defined in the appended claims.

We claim:

1. A method of comparing two binary images corresponding to different thresholdings of a gray-scale image, each of said binary images having a first one of two values for portions of said binary image and a second one of two values for the remainder of said binary image, comprising, prior to applying a character recognition process to said images, the steps of:

locating connected components in each of said binary images;

determining a piece size of each of said connected components, said piece size having a value corresponding to the number of pixels in each of said connected components;

determining piece size distributions for said binary images, each piece size distribution having the number of connected components by size for connected components of each said binary image having said first one of two values; and comparing said piece size distributions by:

constructing a multi-bin histogram of each of said piece size distributions with a first bin corresponding to small piece sizes in said binary images and with a second bin corresponding to big piece sizes in said binary images;

computing a first quotient by dividing the value of said first bin of said histogram for a first of said two binary images by the value of said first bin of said histogram for a second of said two binary images; and computing a second quotient by dividing the value of said second bin of said histogram for a first of said two binary images by the value of said second bin of said histogram for a second of said two binary images; and selecting said first binary image if said first quotient is less than said second quotient multiplied by a quality value.

2. The method of claim 1, wherein the step of determining piece size distributions for said binary images comprises the steps of:

converting the portions of each of said binary images having said first one of two values into a run-length-encoded (RLE) image; and determining the piece size distribution of connected components of each of said RLE images using piece extraction.

3. The method of claim 1, wherein the step of comparing said piece size distributions comprises the steps of:

constructing a multi-bin histogram of each of said piece size distributions; and comparing the values in selected bins of said multi-bin histograms.

4. The method of claim 3, wherein the step of comparing the values in selected bins of said multi-bin histograms comprises the step of:

comparing the ratio of values in a first bin of each of said multi-bin histograms with the ratio of values in a second bin of each of said multi-bin histograms; and further comprising the step of:
   selecting one of said two binary images based on the comparison in the previous step.

5. The method of claim 1, wherein the step of comparing said piece size distributions comprises the steps of constructing a multi-bin histogram of each of said piece size distributions; and providing the values from selected bins of each of said multi-bin histograms as inputs to a previously-trained neural network; and further comprising the step of:
   selecting one of said two binary images based upon the value of the output of said previously-trained neural network.

6. The method of claim 3, wherein said histograms are multi-bin histograms with a first bin corresponding to small connected components in said binary images and with a second bin corresponding to big connected components in said binary images and said step of comparing the values in selected bins of said multi-bin histograms comprises the steps of:

computing a first quotient by dividing the value of said first bin of said histogram for a first of said two binary images by the value of said first bin of said histogram for a second of said two binary images;

computing a second quotient by dividing the value of said second bin of said histogram for a first of said two binary images by the value of said second bin of said histogram for a second of said two binary images; and further comprising the step of:
selecting said first binary image if said first quotient is less than said second quotient multiplied by a quality value.

7. The method of claim 6, wherein said quality value is a preselected constant.

8. The method of claim 6, wherein said quality value is computed from a predetermined formula employing preselected constants and said value of said second bin of said histogram for said first of two binary images.

9. The method of claim 6, wherein said quality value is computed from a predetermined formula employing preselected constants and said value of said second bin of said histogram for said second of two binary images.

10. The method of claim 6, wherein said first bin of said multi-bin histogram contains the count of connected components of said binary images having from 0 to approximately 10 pixels.

11. The method of claim 6, wherein said second bin of said multi-bin histogram contains the count of connected components of said binary images having more than approximately 100 pixels.

12. A method of thresholding a gray-scale image, comprising the steps of
constructing a contrast image corresponding to said gray-scale image, wherein each pixel of said contrast image has a value $LC_{ij}$ given by the formula $$LC_{ij}=C\ (1-(MIN_{ij}+p)/(MAX_{ij}+p)),$$

where (i,j) is the position of said pixel in said contrast image, C is a preselected maximum contrast value, p is a preselected positive value small in comparison to C, $MIN_{ij}$ is the minimum gray-scale value of all pixels in a rectangular window centered on the corresponding position in said gray-scale image, and $MAX_{ij}$ is the maximum gray-scale value of all pixels in said rectangular window;
selecting a predetermined number of sets of thresholding parameters, said thresholding parameters being a peak-floor-level value, a nominal-peak-width value, a minimum-contrast value, a nominal-text-peak-width value, a minimum-contrast-scale value, and a nominal-contrast-excess value;
for each set of thresholding parameters, obtaining a candidate binary image by constructing a contrast histogram of said contrast image over all possible contrast values in said contrast image; finding all peaks in said contrast histogram greater than said preselected peak-floor-level value and separated from any higher peak by said preselected nominal-peak-width value; selecting from among said found peaks a minimum-text peak by locating a peak occurring at the lowest contrast value which is greater than said preselected minimum-contrast value; obtaining a minimum-allowable-contrast value by subtracting said preselected nominal-text-peak-width value from the contrast value of said minimum-text peak; assigning the pixel at the (i,j) position of said gray scale image to a background class of said candidate binary image if $LC_{ij}$ is less than said minimum-allowable-contrast value; computing, if said pixel of said gray scale image is not already assigned to said background class, the difference between $MAX_{ij}$ and $MIN_{ij}$ and assigning said pixel to said background class if said max-to-min difference is less than said preselected minimum-contrast-scale value; computing, if said pixel of said gray scale image is not already assigned to said background class, the difference between $MAX_{ij}$ and the gray-scale value of said pixel and assigning said pixel to said background class if said max-to-pixel-value difference is less than said preselected nominal-contrast-excess value; and assigning, if said pixel of said gray scale image is not already assigned to said background class, said pixel to a foreground class;
selecting a first one of said candidate binary images; converting the portions of said first-selected candidate binary image having a first one of two values into a first run-length-encoded (RLE) image;
prior to applying a character recognition process to said first RLE image, locating connected components in said first RLE image and determining a piece size of each of said connected components, said piece size having a value corresponding to the number of pixels in each of said connected components;
determining a first piece size distribution of connected components of said first RLE image; constructing a first multi-bin histogram of said first piece size distribution;
selecting a second one of said candidate binary images from among said candidate binary images not previously selected; converting the portions of said second-selected candidate binary image having a first one of two values into a second RLE image;
prior to applying a character recognition process to said second RLE image, locating connected components in said second RLE image and determining a piece size of each of said connected components, said piece size having a value corresponding to the number of pixels in each of said connected components;
determining a second piece size distribution of connected components of said second RLE image; constructing a second multi-bin histogram of said second piece size distribution;
picking one of said first-selected candidate binary image and second-selected candidate binary image based on an evaluation of said first and second multi-bin histograms; and
repeating the previous step, with said picked candidate binary image replacing said first-selected candidate binary image, until all said candidate binary images have been selected.

13. The method of claim 12, wherein the step of picking one of said first-selected candidate binary image and second-selected candidate binary image based on an evaluation of said first and second multi-bin histograms comprises the steps of
comparing the ratio of the value in a first bin of said first multi-bin histogram to the value in a first bin of said second multi-bin histogram with the ratio of the value in a second bin of said first multi-bin histogram to the value in a second bin of said second multi-bin histogram; and
picking one of said first-selected candidate binary image and second-selected candidate binary image based on the comparison of said ratios.

14. The method of claim 13, wherein the step of picking one of said first-selected candidate binary image and second-selected candidate binary image based on an evaluation of said first and second multi-bin histograms comprises the steps of
providing the values from selected bins of each of said multi-bin histograms as inputs to a previously-trained neural network; and picking one of said first-selected candidate binary image and second-selected candidate binary image based upon the value of the output of said previously-trained neural network.

15. An apparatus for thresholding a gray-scale image, comprising means for constructing a contrast image corresponding to said gray-scale image, wherein each pixel of said contrast image has a value $LC_{ij}$ given by the formula $$LC_{ij}=C\ (1-(MIN_{ij}+p)/(MAX_{ij}+p)),$$

where (i,j) is the position of said pixel in said contrast image, C is a preselected maximum contrast value, p is a preselected positive value small in comparison to C, $MIN_{ij}$ is the minimum gray-scale value of all pixels in a rectangular window centered on the corresponding position in said gray-scale image, and $MAX_{ij}$ is the maximum gray-scale value of all pixels in said rectangular window;

means for selecting a predetermined number of sets of thresholding parameters, said thresholding parameters being a peak-floor-level value, a nominal-peak-width value, a minimum-contrast value, a nominal-text-peak-width value, a minimum-contrast-scale value, and a nominal-contrast-excess value;

means for obtaining, for each set of thresholding parameters, a candidate binary image by constructing a contrast histogram of said contrast image over all possible contrast values in said contrast image; finding all peaks in said contrast histogram greater than said preselected peak-floor-level value and separated from any higher peak by said preselected nominal-peak-width value; selecting from among said found peaks a minimum-text peak by locating a peak occurring at the lowest contrast value which is greater than said preselected minimum-contrast value; obtaining a minimum-allowable-contrast value by subtracting said preselected nominal-text-peak-width value from the contrast value of said minimum-text peak; assigning the pixel at the (i,j) position of said gray scale image to a background class of said candidate binary image if $LC_{ij}$ is less than said minimum-allowable-contrast value; computing, if said pixel of said gray scale image is not already assigned to said background class, the difference between $MAX_{ij}$ and $MIN_{ij}$ and assigning said pixel to said background class if said max-to-min difference is less than said preselected minimum-contrast-scale value; computing, if said pixel of said gray scale image is not already assigned to said background class, the difference between $MAX_{ij}$ and the gray-scale value of said pixel and assigning said pixel to said background class if said max-to-pixel-value difference is less than said preselected nominal-contrast-excess value; and assigning, if said pixel of said gray scale image is not already assigned to said background class, said pixel to a foreground class;

means for selecting a first one of said candidate binary images; converting the portions of said first-selected candidate binary image having a first one of two values into a first run-length-encoded (RLE) image;

means operative prior to applying a character recognition process to said-first RLE image, for locating connected components in said first RLE image and determining a piece size of each of said connected components, said piece size having a value corresponding to the number of pixels in each of said connected components; determining a first piece size distribution of components of said first RLE image; and constructing a first multi-bin histogram of said first piece size distribution;

means for selecting a second one of said candidate binary images from among said candidate binary images not previously selected; converting the portions of said second-selected candidate binary image having a first one of two values into a second RLE image;

means operative prior to applying a character recognition process to said second RLE image, for locating connected components in said second RLE image and determining a piece size of each of said connected components, said piece size having a value corresponding to the number of pixels in each of said connected components; determining a second piece size distribution of connected components of said second RLE image; and constructing a second multi-bin histogram of said second piece size distribution;

means for picking one of said first-selected candidate binary image and second-selected candidate binary image based on an evaluation of said first and second multi-bin histograms; and means for repeating the previous function, with said picked candidate binary image replacing said first-selected candidate binary image, until all said candidate binary images have been selected.

16. The apparatus of claim 15, wherein the means for picking one of said first-selected candidate binary image and second-selected candidate binary image based on an evaluation of said first and second multi-bin histograms comprises:

means for comparing the ratio of the value in a first bin of said first multi-bin histogram to the value in a first bin of said second multi-bin histogram with the ratio of the value in a second bin of said first multi-bin histogram to the value in a second bin of said second multi-bin histogram; and means for picking one of said first-selected candidate binary image and second-selected candidate binary image based on the comparison of said ratios.

17. The apparatus of claim 15, wherein the means for picking one of said first-selected candidate binary image and second-selected candidate binary image based on an evaluation of said first and second multi-bin histograms comprises:

means for providing the values from selected bins of each of said multi-bin histograms as inputs to a previously-trained neural network; and means for picking one of said first-selected candidate binary image and second-selected candidate binary image based upon the value of the output of said previously-trained neural network.

18. A method of comparing two binary images corresponding to different thresholdings of a gray-scale image, each of said binary images having a first one of two values for portions of said binary image and a second one of two values for the remainder of said binary image, comprising, prior to applying a character recognition process to said images, the steps of:

locating connected components in each of said binary images;

determining a piece size of each of said connected components, said piece size having a value corresponding to the number of pixels in each of said connected components;

determining piece size distributions for said binary images, each piece size distribution having the number of connected components by size for connected components of each said binary image having said first one of two values; and comparing said piece size distributions by:
  constructing a multi-bin histogram of each of said piece size distributions, said histograms being multi-bin histograms with a first bin corresponding to small connected components in said binary images and with a second bin corresponding to big connected components in said binary images; and
  comparing the values in selected bins of said multi-bin histograms by:
    computing a first quotient by dividing the value of said first bin of said histogram for a first of said two binary images by the value of said first bin of said histogram for a second of said two binary images; and
    computing a second quotient by dividing the value of said second bin of said histogram for a first of said two binary images by the value of said second bin of said histogram for a second of said two binary images; and
  selecting said first binary image if said first quotient is less than said second quotient multiplied by a quality value.

19. A computing device having executable instructions for comparing two binary images corresponding to different thresholdings of a gray-scale image, each of said binary images having a first one of two values for portions of said binary image and a second one of two values for the remainder of said binary image, comprising, prior to applying a character recognition process to said images, according to the steps of:

locating connected components in each of said binary images;

determining a piece size of each of said connected components, said piece size having a value equal to the number of pixels in each of said connected components;

determining piece size distributions for said binary images, each piece size distribution having the number of connected components by size for connected components of each said binary image having said first one of two values; and comparing said piece size distributions by:
  constructing a multi-bin histogram of each of said piece size distributions with a first bin corresponding to small piece sizes in said binary images and with a second bin corresponding to big piece sizes in said binary images;
  computing a first quotient by dividing the value of said first bin of said histogram for a first of said two binary images by the value of said first bin of said histogram for a second of said two binary images; and
  computing a second quotient by dividing the value of said second bin of said histogram for a first of said two binary images by the value of said second bin of said histogram for a second of said two binary images; and
  selecting said first binary image if said first quotient is less than said second quotient multiplied by a quality value.

* * * * *